United States Patent [19]
Brown

[11] 3,955,627
[45] May 11, 1976

[54] ROW MARKER FOR AGRICULTURAL IMPLEMENT

[75] Inventor: Victor Elwyn Brown, Corpus Christi, Tex.

[73] Assignee: E. L. Caldwell & Sons, Inc., Corpus Christi, Tex.

[22] Filed: May 13, 1975

[21] Appl. No.: 576,955

[52] U.S. Cl. .................................. 172/130; 172/662
[51] Int. Cl.² ................. A01B 25/00; A01B 49/04
[58] Field of Search ........... 172/126, 127, 128, 129, 172/130, 131, 204, 662

[56] References Cited
UNITED STATES PATENTS

| 576,139 | 2/1897 | Minzey | 172/130 |
| 3,146,833 | 9/1964 | Friemel et al. | 172/126 |
| 3,512,588 | 5/1970 | Cagle | 172/130 |
| 3,587,750 | 6/1971 | Cantral | 172/130 |
| 3,714,991 | 2/1973 | Rieser | 172/130 |
| 3,774,691 | 11/1973 | Oak et al. | 172/130 |

Primary Examiner—George J. Marlo
Attorney, Agent, or Firm—B. P. Fishburne, Jr.

[57] ABSTRACT

Row marker assemblies are pivotally mounted near the ends of a tool bar adapted to carry various types of implements. A pair of marker control arms near the center of the tool bar are connected with the two marker assemblies for controlling the raising and lowering of the latter. A single hydraulic cylinder interconnects the control arms and regulates their movements in cooperation with gravity-responsive pivoted latch bars on the control arms. The latch bars are alternately engaged with a stationary keeper attached to the tool bar and are alternately separated therefrom by a camming and lifting action of each latch bar in response to retraction of the single cylinder, the lifting of each latch bar serving to release the opposing latch bar from the keeper, and the first latch bar then moving by gravity into positive locking engagement with the keeper. Rotational elements, springs and other external controls on the two cooperating latch bars are eliminated.

8 Claims, 12 Drawing Figures

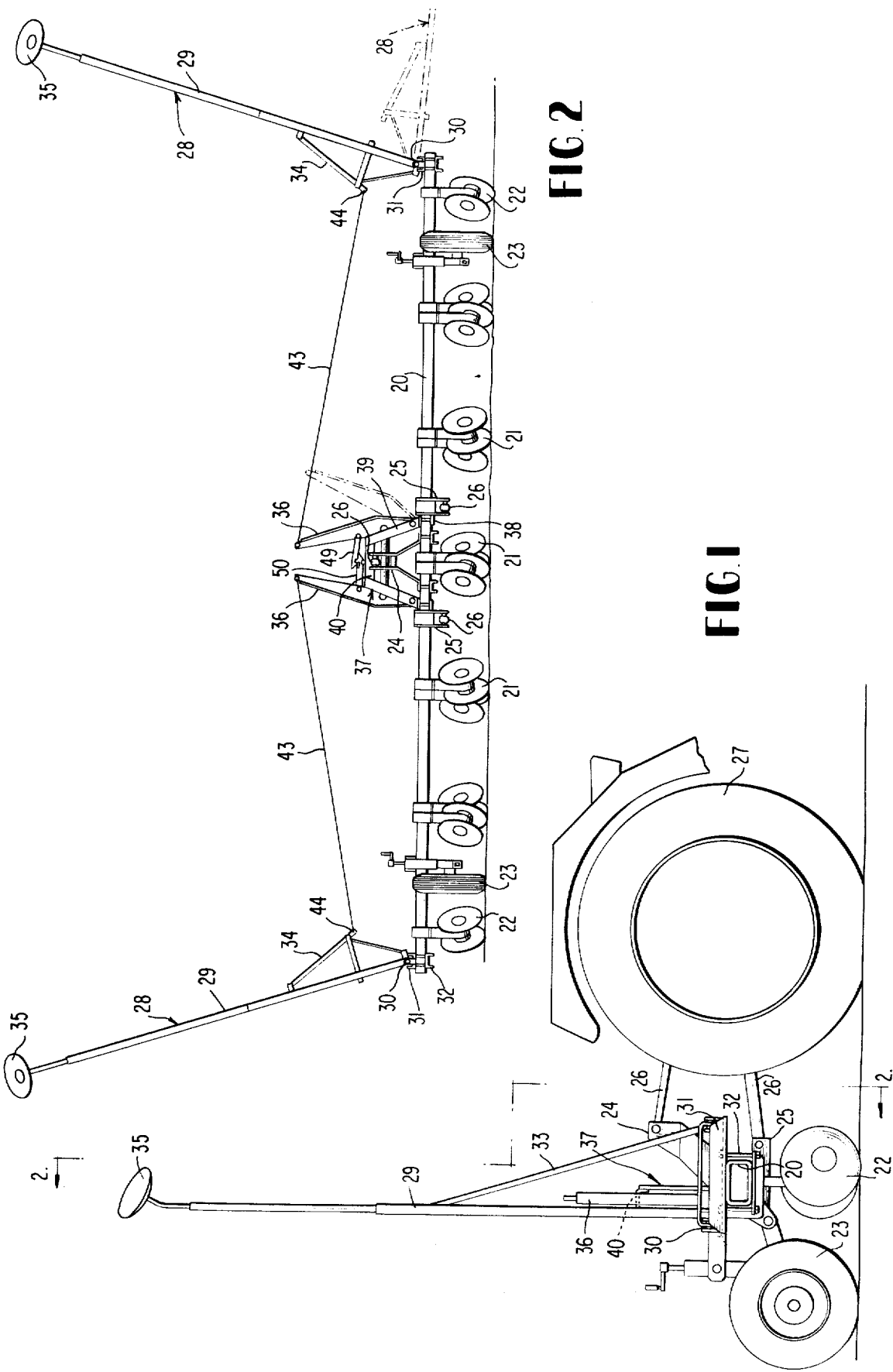

ROW MARKER FOR AGRICULTURAL IMPLEMENT

BACKGROUND OF THE INVENTION

Crop row markers for tractor-drawn implement bars are known in the prior art. In one prior art device, a pair of marker assemblies are mounted for vertical swinging movement on the opposite ends of an implement bar which may be carried by a farm tractor. A single hydraulic cylinder is employed with a pair of pivoted control arms and chains to raise or lower the marker assemblies. Cooperating latch bars pivoted to the control arms are equipped with cam plates which are engaged and influenced by cams on a rotational latch release cam shaft. Over-dead-center stops and rotational biasing means for the cam shaft in the form of a spring is also required.

The objective of this invention is to improve on the prior art in general and the above mentioned device in particular by the provision of a single hydraulic cylinder actuated marker mechanism whose alternately operating latch and release means is greatly simplified and operated in part by gravity and in part by direct cooperative engagement of two pivoted latch bars on the marker control arms of the device. The need for rotational cam elements, shafts, springs or other external biasing and operating means is eliminated in the invention and a much simpler and more positive and direct mode of operation is achieved with fewer parts and with no loss of function due to the elimination of parts. The construction is more sturdy and considerably more economical to build. Parts are eliminated which could become non-operational due to rusting or fouling with mud or debris. The latch bars for the alternately active and inactive row markers are direct in their cooperation and each directly engages a combined stationary latch bar camming and keeper element in a unique and simplified mode of operation under control of the single extensible and retractable hydraulic cylinder which interconnects the two control arms on which the pivoted latch bars are mounted.

A simplified and economical mechanism forming the essence of the invention is also more reliable and efficient in operation than the corresponding means of the prior art.

Other features and advantages of the invention will become apparent during the course of the following detailed description.

BRIEF DESCRIPTION OF DRAWING FIGURES

FIG. 1 is an end elevational view of a tool bar having the row marker assemblies and operating means of the invention mounted thereon.

FIG. 2 is a side elevational view of the invention taken on line 2—2 of FIG. 1.

DETAILED DESCRIPTION

Figure 3:
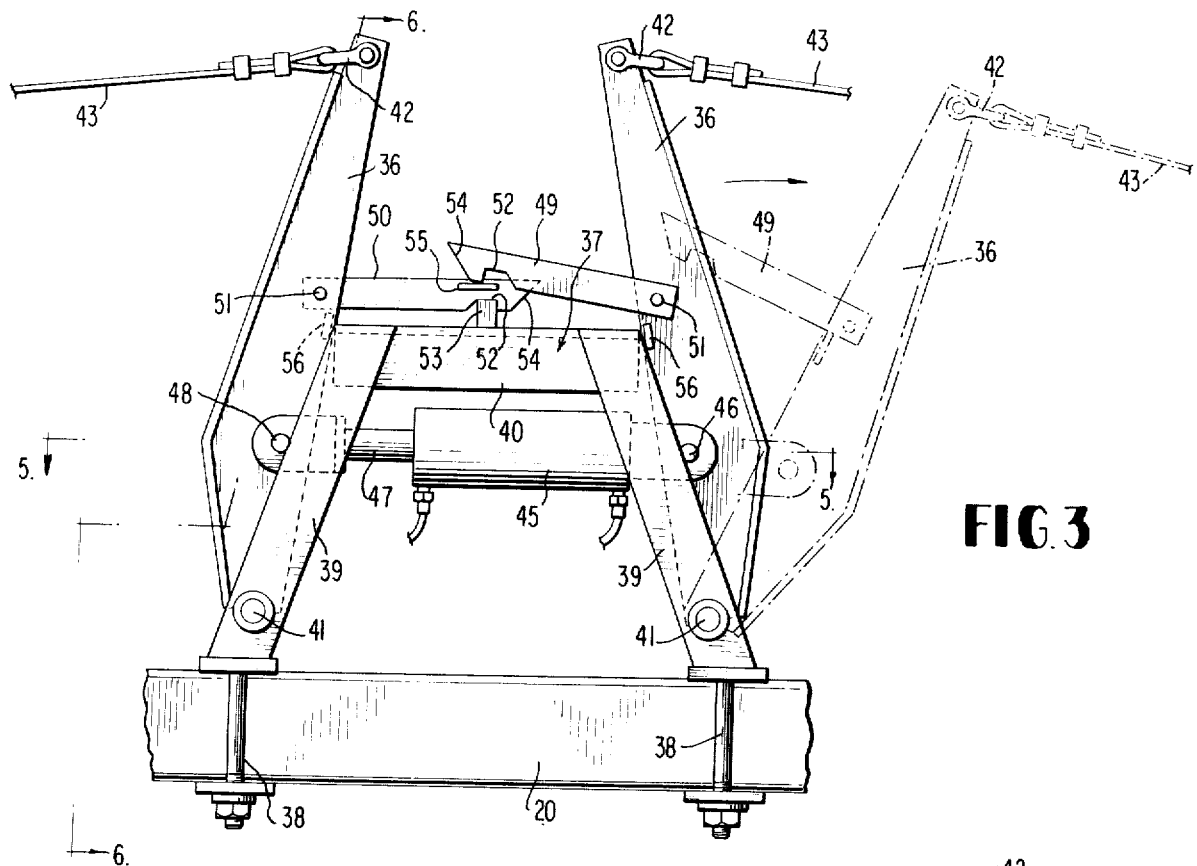
FIG. 3 is an enlarged fragmentary side elevational view of the invention as depicted in FIG. 2.

Referring to the drawings in detail wherein like numerals designate like parts, the numeral 20 designates an elongated tool or implement bar on which a variety of farm implements may be mounted in spaced relation, such as the disc plow units 21 and 22 shown in the drawings. The tool bar may carry other types of earth-working implements as found desirable for a particular application. The implement bar 20 as illustrated is equipped with height adjusting trailing wheel means 23 of a generally conventional nature. As illustrated in FIG. 1, the implement bar has upper and lower bracket members 24 and 25 rigidly mounted thereon for attachment to the well-known three point implement lift 26 of a farm tractor 27. While the implement bar 20 equipped with the invention is customarily transported by a farm tractor having the implement lift means 26, it should be understood that the invention may be utilized on implement bars which are drawn by other means, including bars which have their own wheeled frames.

The invention proper constituting a crop row marker consists of an identical pair of marker assemblies 28 on the opposite ends of the bar 20 including vertically swingable marker arms 29 having their lower ends pivoted as at 30 to mounting brackets 31 which are securely clamped to the top of the bar 20 as by means 32. As shown in FIGS. 1 and 2, the marker arms are braced at 33 and 34 in two right angular planes for rigidity and stability. The arms 29 are adapted to swing in a vertical plane substantially at the rear side of the implement bar 20, FIG. 1. Adjustable marker discs 35 are carried by the outer ends of the arms 29 for contact with the soil when the marker arms are lowered into active use positions by means yet to be described.

Figure 4:
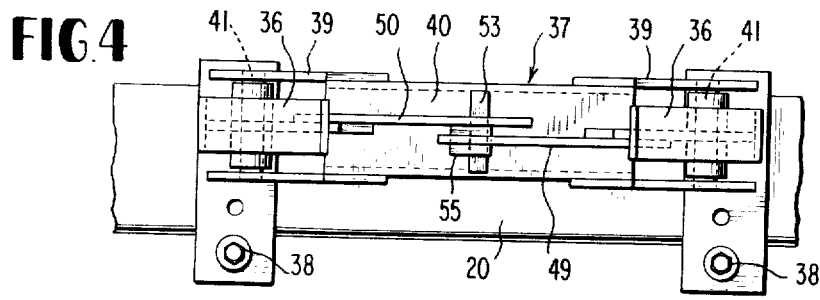
FIG. 4 is a plan view of the invention as shown in FIG. 3.

A pair of vertically swingable spaced opposing marker control arms 36 are provided on the implement bar 20 near the center thereof and spaced equidistantly from the precise longitudinal center of the bar 20. A stationary latch keeper frame 37 is also secured centrally on the implement bar 20 and secured rigidly thereto as by the bar clamping means 38, FIG. 3. The keeper frame 37 includes a pair of inclined converging legs 39 connected at their tops rigidly by a horizontal frame member 40 spaced at an elevation above the implement bar 20. The lower ends of the marker control arms 36 are pivotally secured as at 41 to the legs 39 near the bottoms of the latter and as best shown in FIGS. 3 and 4 the control arms 36 extend into spaces provided between the side webs of the legs 39 of keeper frame 37. The tops of marker control arms 36 are connected through pivoted clevises 42 with cables or the like 43 whose opposite ends are attached at 44 to the brace structure 34 of the marker assemblies 28, FIG. 2.

Figure 5:
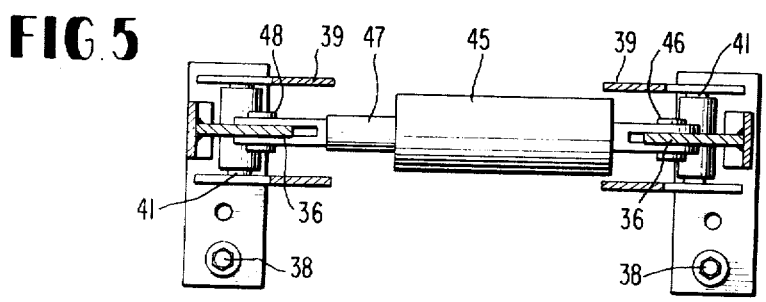
FIG. 5 is a horizontal section taken on line 5—5 of FIG. 3.

The marker control arms 36 are interconnected somewhat above their pivots 41 by a single extensible and retractable hydraulic cylinder 45 having its cylinder end pivotally attached at 46 to one control arm 36 and having its rod 47 pivotally attached at 48 to the other control arm 36. As shown in FIG. 5, the cylinder unit is received between the webs of the two legs 39 with adequate clearance. The single cylinder 45 is operable to swing the control arms 36 individually and selectively in cooperation with control arm latching and release mechanism yet to be described.

Figure 6:
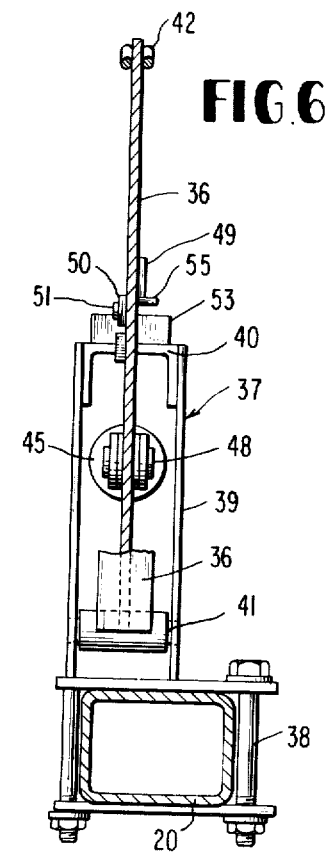
FIG. 6 is a vertical section taken on line 6—6 of FIG. 3.

The control arm latch and release mechanism is illustrated in FIGS. 3 and 7 through 12 and comprises a pair of cooperating vertically swingable gravity urged latch bars 49 and 50, one for each control arm 36 and pivoted thereto as at 51 above the top of keeper frame 37 and well below the tops of the arms 36. As shown in FIG. 4, the two latch bars 49 and 50 are pivoted to opposite sides of control arms 36 and are therefore arranged in parallel relatively closely spaced vertical planes. Each latch bar 49 and 50 has a locking notch 52 in its lower edge and near its leading free end adapted at prescribed times to receive and positively interlock with a single upstanding keeper or stop element 53 fixed to the top of the frame 37 at the center thereof. As shown in FIGS. 4 and 6, the keeper 53 lies beneath both latch bars 49 and 50 and is common thereto.

Each latch bar 49 and 50 has a beveled or inclined leading end face 54 serving as a cam in the operation of the latch and release mechanism, as will be further described. As viewed from the side, FIG. 3, the end faces 54 slope in oppposite directions. The latch bar 50 has a small flat plate extension 55 fixed thereto and projecting beyond one side thereof at right angles to the vertical plane in which the pivoted bar 50 swings during the operation of the mechanism. This rigid plate extension 55 is adapted to underlie the cooperating latch bar 49 in certain circumstances, FIG. 3, and to lie above the bar 49 at other times, FIGS. 8 and 9. The plate extension 55 is positioned on the bar 50 somewhat rearwardly of the leading inclined edge 54 and above the locking notch 52 of the arm 50. Each control arm 36 has a fixed positive stop lug 56 thereon to arrest downward movement of the associated latch bars 49 and 50 which are otherwise free to drop by gravity on their pivots 51. Downward movement of the latch bars is thus limited when either latch bar is released from the keeper 53 and is free hanging on its pivot 51 in a position approximately at right angles to the adjacent marker control arm 36. Such limited position of the latch bar 50, for example, is depicted in FIG. 10 of the drawings.

OPERATION

In general, as described in the above reference, Friemel et al. patent, one marker assembly 28 is in a down active position longitudinally of the implement bar 20 on one side of the tractor during an earthworking operation while the other marker assembly is elevated. Both marker assemblies 28 will be elevated by retraction of the cylinder 45 while the tractor is turning at the end of the field. During the next traverse of the field, the outboard marker assembly will be down or active and the tractor driver will be following the mark produced on the previous traverse.

Figure 7:
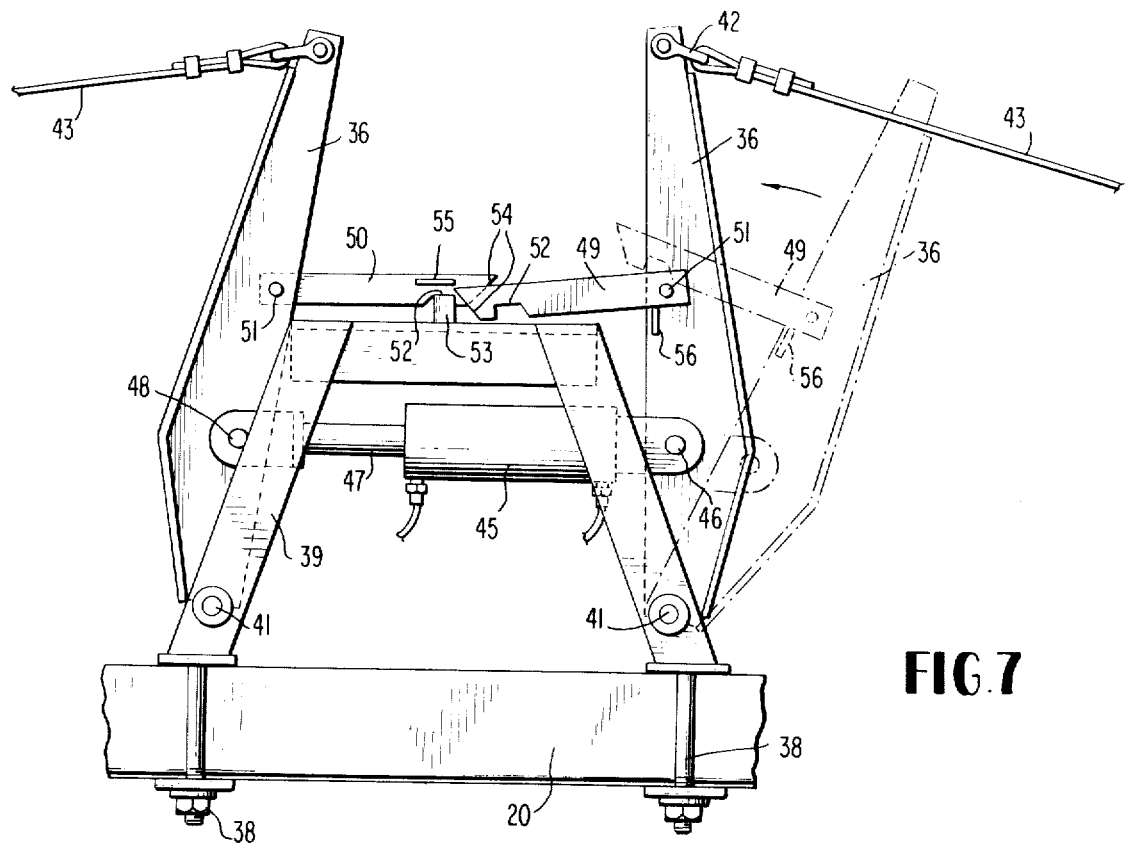
FIG. 7 is a view similar to FIG. 3 depicting the approach of one latch bar toward the stationary keeper and camming element.

More particularly, referring to FIGS. 7 through 12, in FIG. 7, the right hand marker control arm 36 is being drawn inwardly by retraction of the cylinder 45 and the latch bar 49 is free hanging on its stop lug 56 while approaching the keeper 53 and opposing latch bar 50 of arm 36 which is already engaged with the keeper through its locking notch 52 so that the adjacent arm 36 is locked in the upright position.

Figure 8:
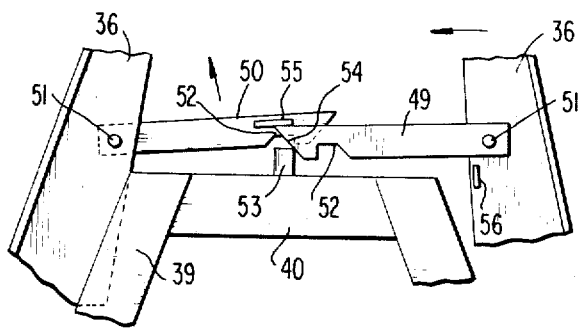
FIG. 8 is a similar view showing the lifting of the second latch bar by the approaching latch bar as the approaching bar is cammed upwardly by the keeper.

Moving to FIG. 8, the cylinder 45 is still retracting and the right hand control arm 36 is still moving in the direction of the arrow, and the leading inclined end face 54 of latch bar 49 has engaged the fixed keeper 53 and has been cammed upwardly by the keeper. The tip of the latch bar 49 by this time has passed beneath the side plate extension 55 of the opposing latch bar 50 and, as a consequence, the upward movement of the bar 49 will lift the latch bar 50 until its locking notch 52 is above and clear of the keeper 53.

Figure 9:
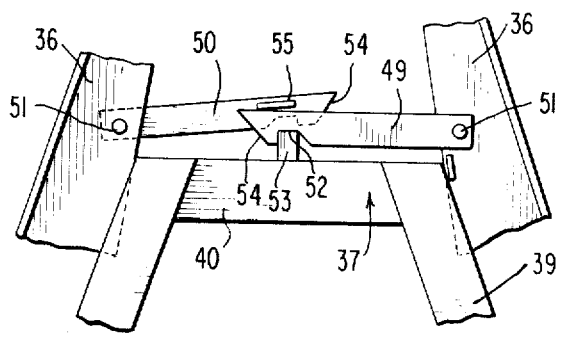
FIG. 9 is a similar view showing the previously-approaching latch bar positively engaged with the keeper after lifting the second latch bar therefrom during the camming action.
Figure 10:
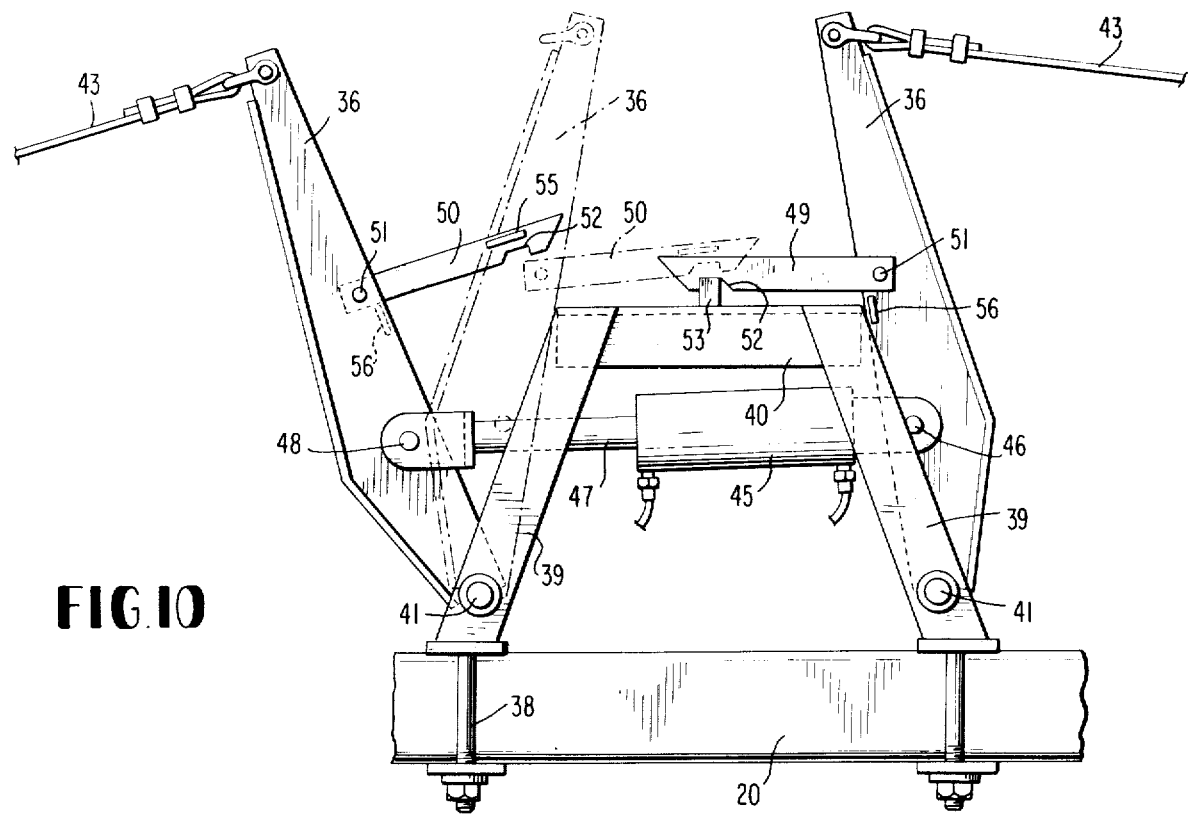
FIG. 10 is a similar view showing the released latch bar and associated marker control arm receding from the position shown in FIG. 9 while the other control arm is locked in the raised position with the associated marker assembly.

Slight continued movement of the bar 49 with the associated control arm 36 in FIG. 9 will position the notch 52 of the bar 49 to drop over the keeper 53 by gravity for positively locking the bar 49 with the keeper, thus locking the associated arm 36 relative to the frame 37. The particular marker assembly 28 associated with the now locked latch bar 49 will be held up or inactive. In FIG. 9, the opposing latch bar 50 is now fully released from the keeper 53 and the plate extension 55 is riding slidably and freely on the upper edge of latch bar 49.

Thus, referring to FIG. 10, the control arm 36 carrying latch bar 50 is freed to move outwardly and downwardly as the hydraulic cylinder 45 now begins to be extended, and the corresponding row marker assembly 28 is being lowered to the active marking position. In FIG. 10, the other marker control arm 36 carrying latch bar 49 is positively locked by keeper 53 in the up or marker inactive position, and because of this, the body of the cylinder 45 cannot extend to the right in FIG. 10 and only the rod 47 can move or extend to the left, as shown.

Figure 11:
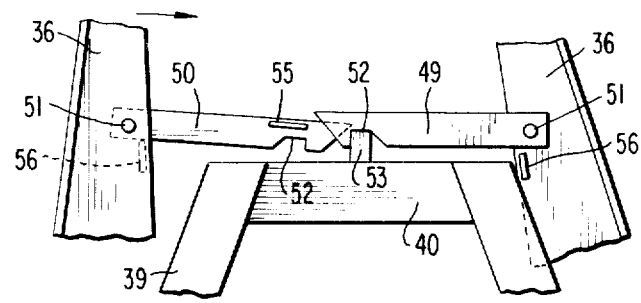
FIG. 11 is a similar view showing the return of the previously-released latch bar during the next retraction of the cylinder and its approach to the keeper and the actively engaged latch bar.

Continuing to FIG. 11, the condition is shown where the cylinder 45 is again retracting and the marker control arm 36 having latch bar 50 is being drawn inwardly in the direction of the arrow for raising the associated marker assembly. The other control arm 36 continues to be locked up by the engagement of latch bar 49 with keeper 53.

Figure 12:
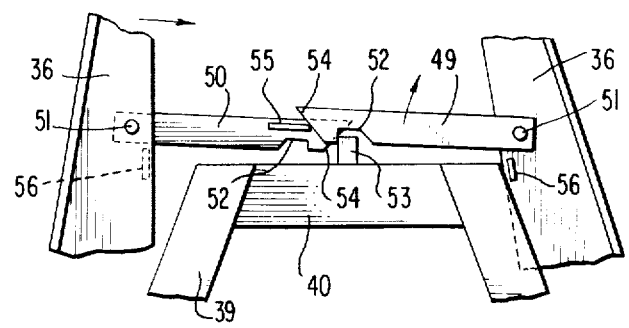
FIG. 12 is a similar view showing the releasing of the engaged latch bar by a camming element on the approaching latch bar, prior to the parts returning to their relative position of FIG. 3.

Continuing to FIG. 12, continued approach of latch bar 50 toward latch bar 49 will bring extension plate 55 into camming contact with the inclined end face 54 of bar 49, whereby the latter begins to be elevated in the direction of the arrow around its pivot 51. Substantially simultaneously, the inclined end face of the bar 50 will begin to engage fixed keeper 53 cammingly. Continued relative movement of the parts in FIG. 12 will quickly lift latch bar 49 free of keeper 53 and release the associated marker control arm 36 for outward and downward movement. Also, end face 54 of latch bar 50 will ride up on keeper 53 and cause the locking notch 52 of bar 50 to engage lockingly with keeper 53 by gravity. At this point, the parts are positioned as depicted in FIG. 3 and the left hand control arm 36 in that figure is locked up and the right hand control arm is released for outward movement to lower its associated marker assembly as the cylinder 45 again begins to extend. Also in FIG. 3, the latch bar 49 has ridden up on top of extension plate 55 from its previous position in FIG. 12 and is disposed freely and slidably on the element 55.

In this manner, an alternating up and down or inactive or active movement of the two marker assemblies 28 is achieved by use of a single hydraulic cylinder and by a greatly simplified direct interaction of the two gravity biased latch bars 49 and 50 and the fixed keeper 53 common to both, along with the assistance of the extension plate 55 on one latch bar only. No rotary cam shafts, springs, crank arms or the like are employed, or any external parts likely to become bound with rust or rendered inoperative by mud or debris. A very simplified, direct camming and lifting motion is utilized to alternately lock and release the marker control arms 36.

On the one hand, the upward camming of the latch bar 49 by keepr 53, FIGS. 8 and 9, causes lifting of the latch bar 50 through its extension plate 55. On the other hand, FIGS. 11 and 12, the combined camming action of the extension plate 55 with the end face 54 of bar 49 and of the end face of bar 50 with keeper 53 causes raising of latch bar 49 by means of extension plate 55 to the position of FIG. 3.

As appears clearly in the drawings, when either latch bar 49 or 50 is positively locked to the stationary keeper element 53, the associated control arm 36 is locked. Therefore, expansion of the cylinder 45 can only move the other control arm which is unlocked outwardly for lowering the associated row marker unit or assembly 28. Consequently, depending on which one of the latch bars 49 or 50 is locked to the keeper 53, the cylinder will expand in one direction only, to the right or to the left by outward movement of the cylinder body or the piston rod 47, as the case may be. This enables the single cylinder to effect the desired alternate operation of the markers through the cooperating direct acting latch and release means involving the latch bars 49 and 50, plate extension 55 and stationary keeper element 53.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A row marker apparatus comprising a tool bar, a pair of independently operable row marker units on the tool bar near its opposite ends, a pair of independently operable marker control arms on the tool bar near its center, means interconnecting each control arm with one marker unit, a single extensible and retractable power device interconnecting said control arms, a stationary keeper element on the tool bar near said control arms, and a single gravity urged latch bar pivoted to each control arm and having a lower edge notch adapted to interlock with said stationary keeper element under the influence of gravity and having a leading end inclined face adapted to cammingly engage said keeper element to cause lifting of the latch bar, and a side extension element secured to one of said latch bars adapted to engage cammingly said inclined face of the other latch bar for lifting the other latch bar, said side extension element also adapted to have said other latch bar pass beneath it and to be lifted thereby during engagement of said inclined face of the other latch bar with said keeper element, said latch bars disposed in side by side end to end overlapping engagement.

2. The structure of claim 1, and a fixed stop element on each said control arm below one of said latch bars to positively limit downward movement thereof by gravity, the latch bars being freely pivoted for unimpeded upward movement relative to said keeper element.

3. The structure of claim 2, and wherein each lower edge notch of the latch bars includes a substantially square corner, and said keeper element comprising a block-like element having a square upper corner to interlock with the square corners of said notches when the latter fall by gravity into engagement with the keeper element, the keeper element extending transversely beneath both said latch bars and being common to the latch bars.

4. The structure of claim 3, and a stationary elevated support frame for said keeper element on said tool bar, said marker control arms being generally upstanding with their lower ends pivoted whereby the control arms swing in a vertical plane, and said latch bars being generally horizontal and being pivoted to said control arms somewhat above said support frame.

5. The structure of claim 1, and said row marker units including vertically swingable arms having their inner ends pivoted to said tool bar, said means interconnecting each control arm with one marker unit comprising a tension element.

6. The structure of claim 1, and means on said tool bar near the longitudinal center thereof adapted to be coupled with a standard hitch and lift means of a tractor.

7. The structure of claim 6, and said single extensible and retractable power device comprising a hydraulic cylinder unit adapted for connection in the hydraulic system of a farm tractor.

8. A row marker apparatus for an agricultural implement mounting bar of a type adapted to be carried by a farm tractor and to span several crop rows transversely during movement with the tractor lengthwise of rows, said apparatus comprising a pair of vertically swingable row marker units adapted to be pivotally mounted on an implement mounting bar near the opposite ends thereof, a pair of opposing vertically swingable control arms for said marker units adapted to be pivotally mounted on an implement bar inwardly of the marker units and each control arm being operatively connected with one marker unit for raising and lowering one marker unit independently of the other marker unit, a single extensible and retractable power device interconnecting the control arms whereby they may be swung vertically on their pivots, a stationary keeper element disposed between said control arms, and a single gravity influenced vertically swingable pivoted latch bar on each control arm extending toward the opposite control arm and of a length to extend across said keeper element, each latch bar having a bottom edge locking notch near its leading end adapted to engage lockingly over said stationary keeper element to thereby positively lock the associated control arm against outward movement by said extensible and retractable power device, each latch bar having an inclined leading end face adapted to cammingly engage one side of said stationary keeper element so that such latch bar may be elevated by the keeper element whereby its locking notch may move into locking engagement with the keeper element, and a side extension plate element on one of said latch bars in the path of the inclined end face of the other latch bar whereby relative movement of the latch bars in one direction causes the side extension plate element to engage the inclined end face of the opposing latch bar cammingly to lift the opposing latch bar, and the opposing latch bar adapted during relative movement of the two latch bars to engage liftingly beneath the side extension plate element during the period that the inclined end face of the opposing latch bar is engaging and cammingly rising on said stationary keeper element.

* * * * *